US011306206B2

(12) United States Patent
Hamad et al.

(10) Patent No.: US 11,306,206 B2
(45) Date of Patent: Apr. 19, 2022

(54) VACUUM-ASSISTED CO-EXTRUSION OF FLEXIBLE FIBRES AND THE MOLDABLE THERMOPLASTIC COMPOSITES PRODUCED

(71) Applicant: FPInnovations, Pointe-Claire (CA)

(72) Inventors: Wadood Yasser Hamad, Vancouver (CA); Shunxing Su, Richmond (CA); Norman Roberts, Burnaby (CA); Otman Oulanti, Montreal (CA); Michelle Agnes Ricard, Pointe-des-Cascades (CA); Chuanwei Miao, Richmond (CA)

(73) Assignee: FPInnovations, Pointe-Claire (CA)

( * ) Notice: Subject to any disclaimer, the term of this patent is extended or adjusted under 35 U.S.C. 154(b) by 0 days.

(21) Appl. No.: 16/320,567

(22) PCT Filed: Jul. 25, 2017

(86) PCT No.: PCT/CA2017/050892
§ 371 (c)(1),
(2) Date: Jan. 25, 2019

(87) PCT Pub. No.: WO2018/018143
PCT Pub. Date: Feb. 1, 2018

(65) Prior Publication Data
US 2019/0161616 A1 May 30, 2019

Related U.S. Application Data

(60) Provisional application No. 62/367,183, filed on Jul. 27, 2016.

(51) Int. Cl.
| | | |
|---|---|---|
| *C08L 97/02* | (2006.01) | |
| *C08L 23/12* | (2006.01) | |
| *C08L 23/06* | (2006.01) | |
| *C08L 67/04* | (2006.01) | |
| *C08L 55/02* | (2006.01) | |
| *C08J 3/20* | (2006.01) | |
| *C08J 3/21* | (2006.01) | |
| *B29B 7/92* | (2006.01) | |

(Continued)

(52) U.S. Cl.
CPC .............. *C08L 97/02* (2013.01); *B29B 7/483* (2013.01); *B29B 7/488* (2013.01); *B29B 7/489* (2013.01); *B29B 7/726* (2013.01); *B29B 7/728* (2013.01); *B29B 7/823* (2013.01); *B29B 7/826* (2013.01); *B29B 7/86* (2013.01); *B29B 7/92* (2013.01); *B29C 48/00* (2019.02); *B29C 48/022* (2019.02); *B29C 48/144* (2019.02); *B29C 48/18* (2019.02); *B29C 70/44* (2013.01); *C08J 3/203* (2013.01); *C08J 3/2053* (2013.01); *C08J 3/212* (2013.01); *C08L 23/06* (2013.01); *C08L 23/12* (2013.01); *C08L 55/02* (2013.01); *C08L 67/04* (2013.01); *B29B 9/06* (2013.01); *B29B 9/14* (2013.01); *B29C 48/14* (2019.02); *B29C 48/54* (2019.02); *B29C 48/55* (2019.02); *B29C 48/57* (2019.02); *B29C 48/875* (2019.02); *B29C 2791/006* (2013.01); *B29K 2001/00* (2013.01); *B29K 2101/12* (2013.01); *B29K 2311/14* (2013.01); *C08J 2323/06* (2013.01); *C08J 2323/12* (2013.01); *C08J 2367/04* (2013.01); *C08L 2205/03* (2013.01); *C08L 2205/08* (2013.01); *C08L 2205/16* (2013.01)

(58) Field of Classification Search
CPC .......... C08L 97/02; C08L 23/12; C08L 23/06; C08L 67/04; C08L 55/02; C08L 2205/08; C08L 2205/16; C08L 2205/03; C08J 3/203; C08J 3/212
See application file for complete search history.

(56) References Cited

U.S. PATENT DOCUMENTS

| | | | |
|---|---|---|---|
| 4,900,494 A | 2/1990 | Wobbe | |
| 5,442,041 A * | 8/1995 | Mallikarjun | ............ C08F 6/001 |
| | | | 264/101 |

(Continued)

FOREIGN PATENT DOCUMENTS

| | | |
|---|---|---|
| CN | 106902024 | 6/2017 |
| WO | 2014123478 | 8/2014 |

OTHER PUBLICATIONS

Nilsson et al. "Confomability of wet pulp fibers at small scales", Mid Sweden University, Fiber Science & Communication Network, 2000.

*Primary Examiner* — Robert D Harlan
(74) *Attorney, Agent, or Firm* — Norton Rose Fulbright Canada LLP

(57) ABSTRACT

A composite and method for producing the composite by incorporating wood or wood pulp fibres with a suitable thermoplastic polymer and coupling agent are described. Homogeneous, void-free transparent/translucent thermoplastic materials in the form of pellets, films or three-dimensional moldable products are produced. The wood pulp fibres can be discrete natural fibres, and flexible assemblies of nano to micro elements, e.g., assemblies of aggregated carbon nanotubes. It is also possible to use our vacuum-assisted co-extrusion process to produce hybrid composites comprising the wood pulp fibre and a further rigid fibre, like glass or carbon fibres, and a flexible fibre or fibrillar network, like cellulose fibres or cellulose filaments. The thermoplastic resin can be, but not limited to, polyolefins, like polypropylene or polyethylene, or polyesters, like polylactic acid, or co-polymers, like acrylonitrile-butadiene-styrene terpolymer.

18 Claims, 13 Drawing Sheets

(51) Int. Cl.
*B29C 48/00* (2019.01)
*B29C 70/44* (2006.01)
*C08J 3/205* (2006.01)
*B29C 48/14* (2019.01)
*B29C 48/18* (2019.01)
*B29B 7/48* (2006.01)
*B29B 7/72* (2006.01)
*B29B 7/82* (2006.01)
*B29B 7/86* (2006.01)
B29K 311/14 (2006.01)
B29K 1/00 (2006.01)
B29C 48/57 (2019.01)
B29C 48/875 (2019.01)
B29C 48/54 (2019.01)
B29C 48/55 (2019.01)
*B29B 9/14* (2006.01)
*B29B 9/06* (2006.01)
B29K 101/12 (2006.01)

(56) References Cited

U.S. PATENT DOCUMENTS

2007/0027234 A1  2/2007  Sigworth et al.
2013/0207302 A1  8/2013  Cernohous et al.
2013/0210965 A1* 8/2013  Hamilton ................ C08J 5/045
                                                524/14
2013/0276670 A1  10/2013 Cernohous et al.

* cited by examiner

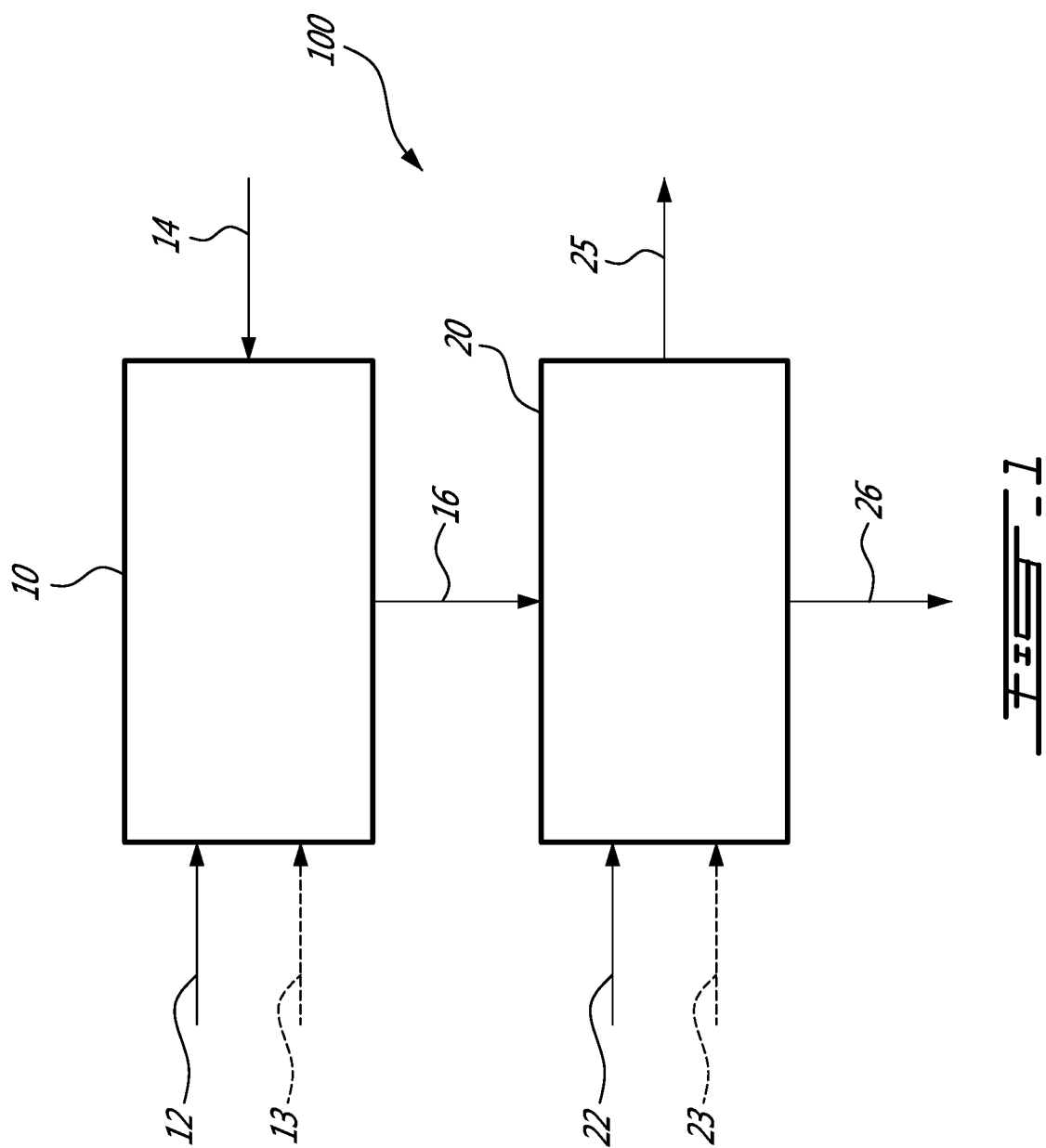

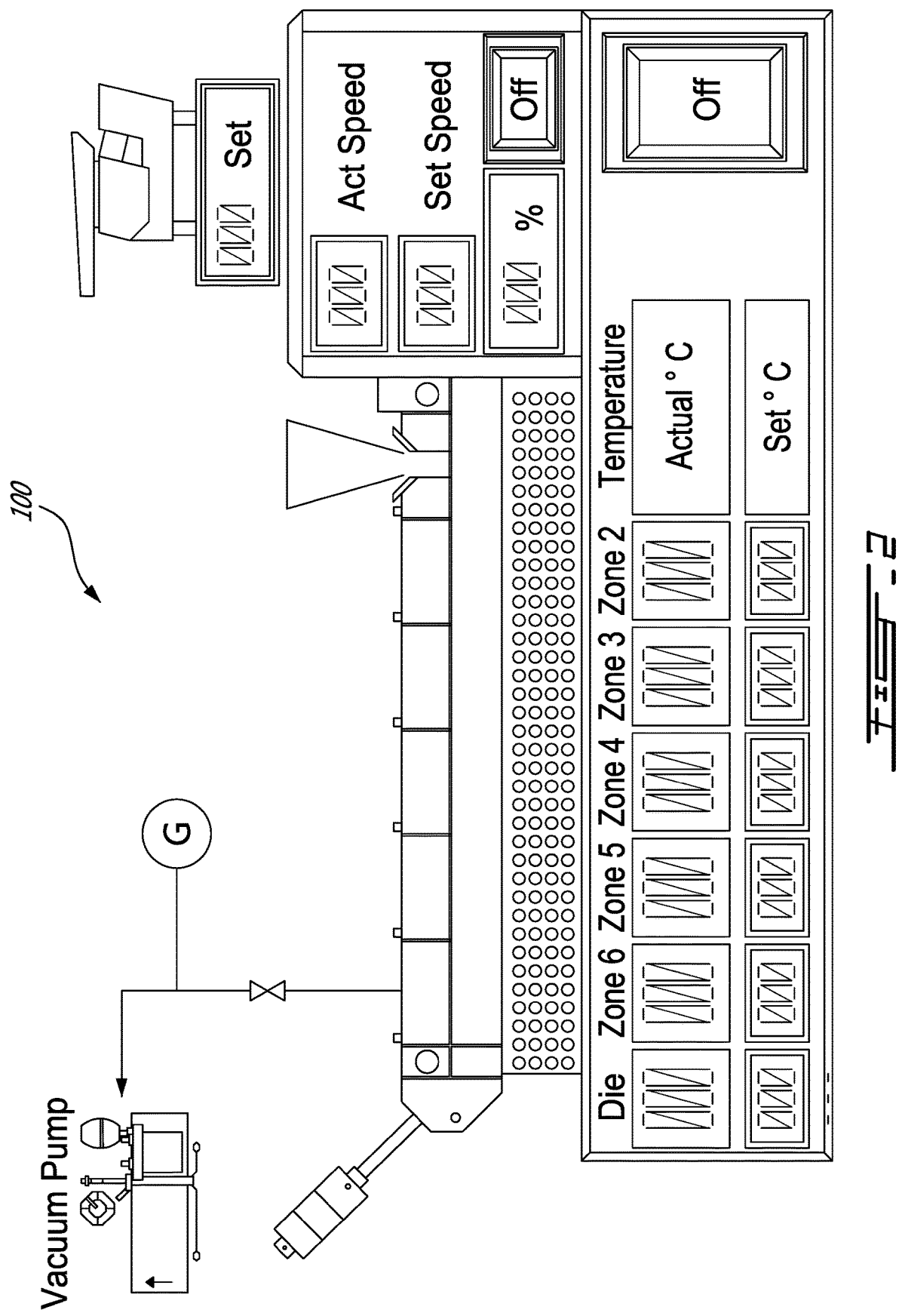

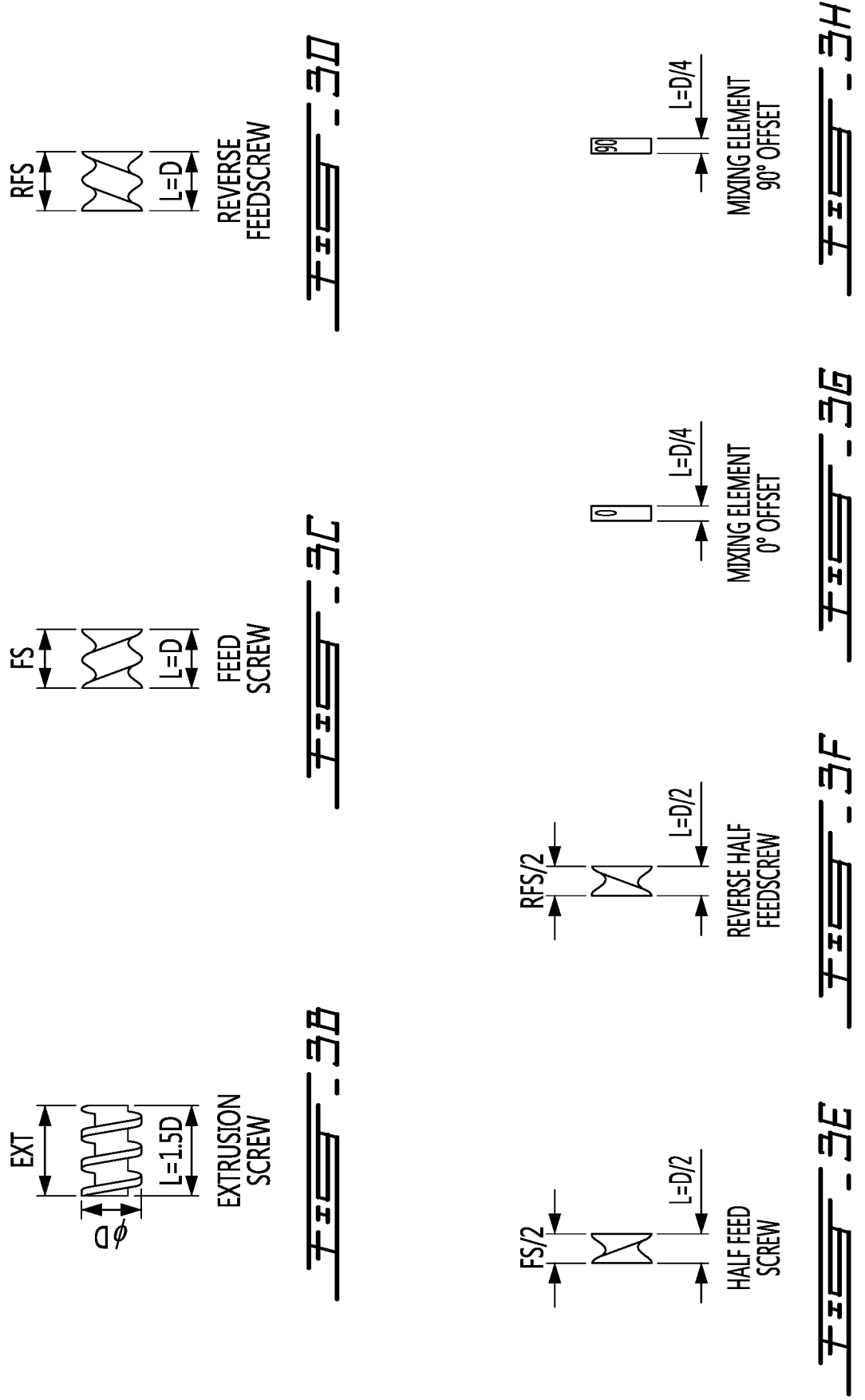

NBSK 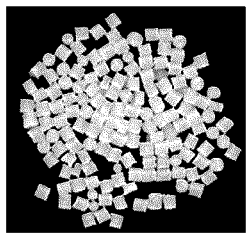 
FIG. 4A
Aspen kraft 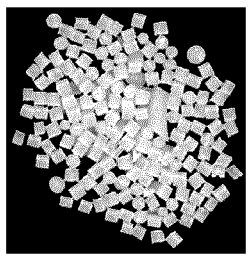 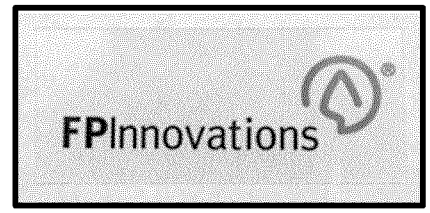
FIG. 4B
BCTMP 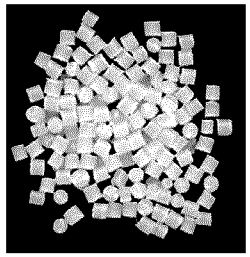 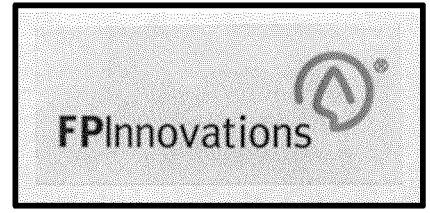
FIG. 4C
MDF 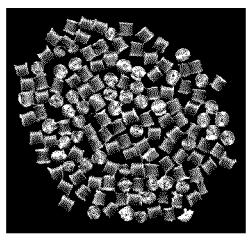 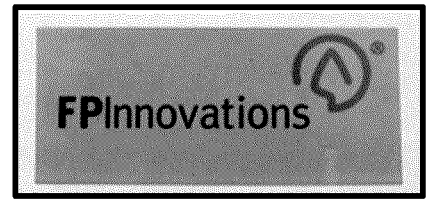
FIG. 4D

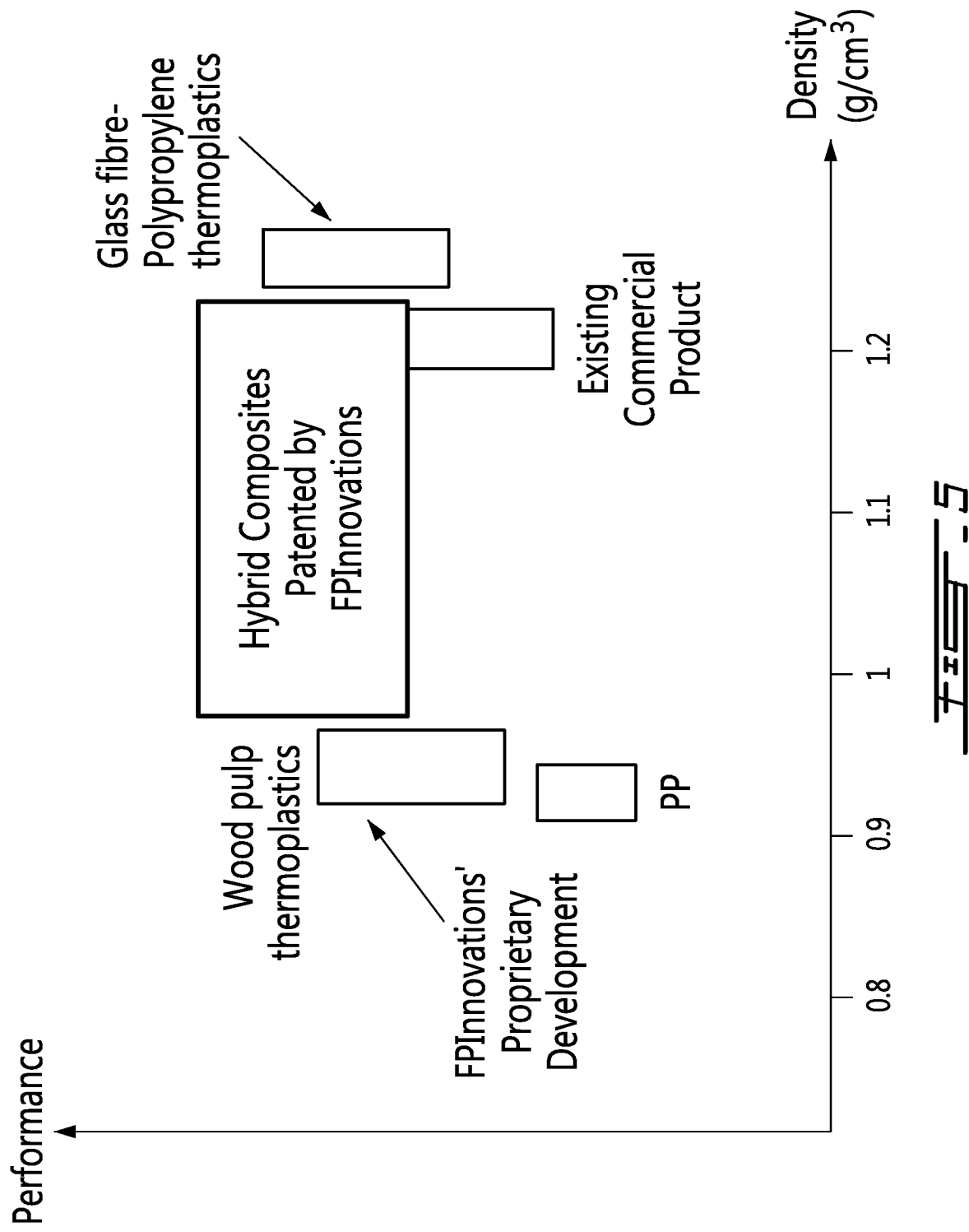

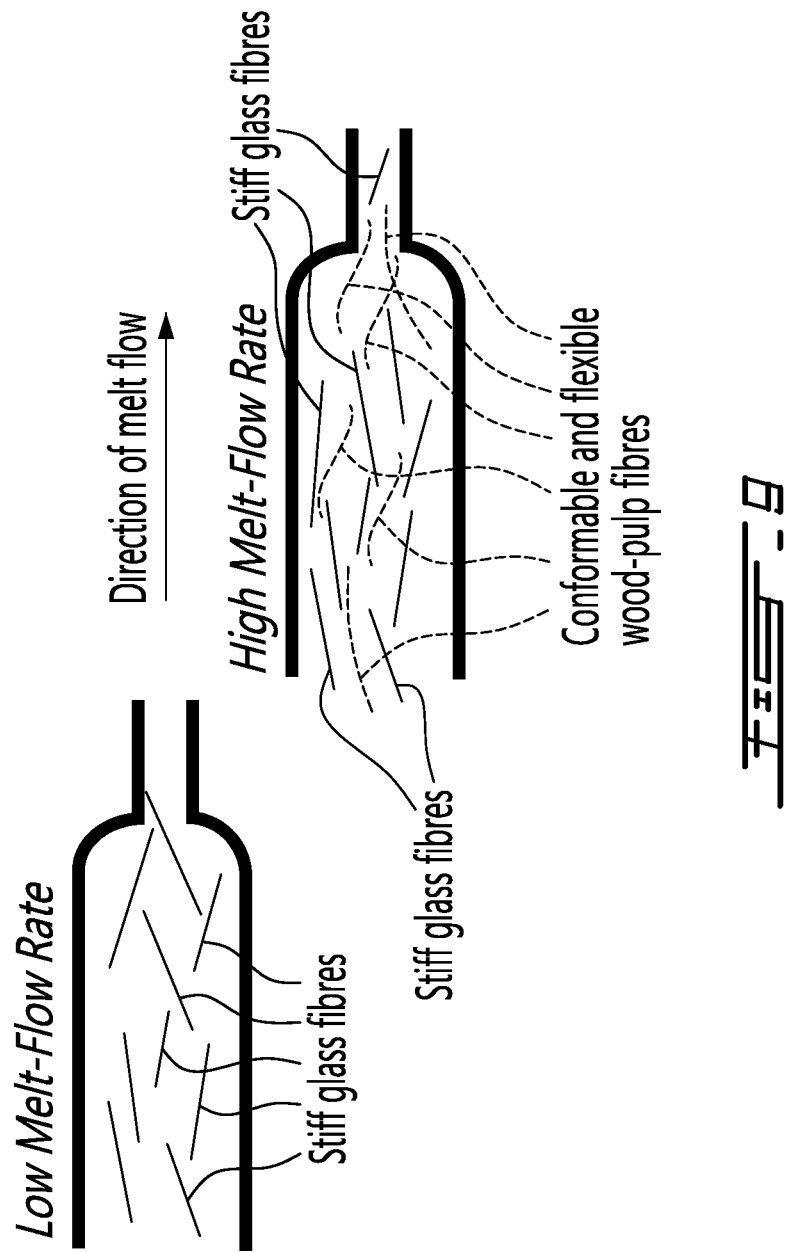

VACUUM-ASSISTED CO-EXTRUSION OF FLEXIBLE FIBRES AND THE MOLDABLE THERMOPLASTIC COMPOSITES PRODUCED

CROSS-REFERENCE TO RELATED APPLICATIONS

The present application is a U.S. National Phase of International Application No. PCT/CA2017/050892, filed on Jul. 25, 2017 and claiming priority from U.S. Provisional Application No. 62/367,183 filed Jul. 27, 2016, the content of which is hereby incorporated by reference in its entirety.

BACKGROUND i) Field

A system and method to incorporate flexible fibres with a suitable thermoplastic polymer and coupling agent is described, where the method produces perfectly homogeneous, void-free transparent thermoplastic composite materials in the form of pellets, films or three-dimensional moldable products.

ii) Description of the Prior Art

Biofibres as reinforcement components in thermoplastic composites have been drawing great attention in the last few decades due primarily to increasing environmental concerns, but also owing to their high performance and their low density. Nowadays, the dominant fibres used in fibre reinforced thermoplastics are still synthetic fibres, mainly glass fibres, which are widely used because of their low cost and good mechanical properties. Compared to glass fibres, biofibres are carbon-neutral, renewable, recyclable and have much lower density at similar performance. Over the past two decades, biofibre reinforced thermoplastics have increasingly been utilized in automotive, construction, furniture, and other industries. Within the automotive sector, polypropylene (PP) is the typical thermoplastic resin, and biofibre-reinforced thermoplastics have broadly been used in non-structural auto parts, such as door panels, package trays, seat backs, trunk liners, etc.

A drawback of biofibre-PP composites is their inherent incompatibility at the interfaces. The highly polar surface of cellulose causes poor interfacial compatibility with the non-polar polypropylene. Numerous strategies have been studied to improve the polymer-fibre interfacial interactions. Among strategies, maleic anhydride-grafted polymers are deemed to be very effective and have been widely used on a commercial scale. The anhydride groups on the coupling agents can form covalent bonds with the hydroxyl groups on cellulose through esterification. As a result, the polarity of the cellulose surface can be reduced and, in turn, compatibility with the non-polar polymer improved. The mechanical properties of the polymer/cellulose composites should ultimately be increased.

Co-extrusion has been widely used for compounding thermoplastic polymers with additives and reinforcement, whereby the twin screws of the co-extruder are used to blend the additives or reinforcement into the thermoplastic melt. The design of the twin screws, which may co- or counter-rotate, can be a critical aspect for the ultimate design of the product with the required attributes. During the co-extrusion process, air bubbles could get trapped, particularly when attempting to extrude incompatible and heterogeneous ingredients. These air bubbles could be the location for creating microcracks in the composite product, as well as a weak interface between the reinforcement and polymer. Some inventors (U.S. Pat. Nos. 4,067,554 and 4,063,718) have attempted to de-gas thermoplasts and elastomers using twin-screw extruders, while others (US Patent Application 2011/0001255 A1) de-gassed polyurethane foams prepared using co-extrusion. Co-extrusion has also been used to prepare fibrous, porous substrates (US Patent Application 2009/0166910 A1), which is opposite to the goals described herein.

SUMMARY

In accordance with one embodiment, there is provided a composite comprising: 50 to 96 wt. % of a thermoplastic resin; 0.1 to 10 wt. % of a compatibilizer; and 2 to 40 wt. % of a wood pulp fibre, wherein the composite comprises less than 0.5 wt. % of water.

In accordance with another embodiment, there is provided the composite described herein, wherein the thermoplastic is a polyolefin, a polyester resin or a copolymer resin.

In accordance with another embodiment, there is provided the composite described herein, wherein the polyolefin is a polypropylene or a polyethylene.

In accordance with another embodiment, there is provided the composite described herein, wherein the polyester is a polylactic acid.

In accordance with another embodiment, there is provided the composite described herein, wherein the copolymer is an acrylonitrile-butadiene-styrene terpolymer.

In accordance with another embodiment, there is provided the composite described herein, wherein the thermoplastic resin is 55 to 90 wt. % of the composite.

In accordance with another embodiment, there is provided the composite described herein further comprising 10 to 20 wt. % glass fibres.

In accordance with another embodiment, there is provided the composite described herein, comprising a Melt Flow Rate of 10 to 22 g/10 min measured at 230° C./2.16 kg according to ASTM D1238.

In accordance with another embodiment, there is provided the composite described herein, wherein the wood pulp fibre is from 2 to 40 wt. % of the composite.

In accordance with another embodiment, there is provided the composite described herein, wherein the composite further comprises filamentous material selected from the group consisting of cellulose nanofilament, and carbon nanofilaments.

In accordance with another embodiment, there is provided the composite described herein, wherein the composite is translucent.

In accordance with another embodiment, there is provided a composite comprising 55 to 90 wt. % thermoplastic; 0.1 to 10 wt. % maleic anhydride, and less than or equal to 40 wt. % wood pulp fibres, wherein the composite comprises less than 0.5 wt. % of water.

In accordance with another embodiment, there is provided the composite described herein, wherein the thermoplastic is a polyolefin, a polyester or a copolymer resin.

In accordance with another embodiment, there is provided the composite described herein, wherein the polyolefin is a polypropylene or a polyethylene.

In accordance with another embodiment, there is provided the composite described herein, wherein the polyester is a polylactic acid.

In accordance with another embodiment, there is provided the composite described herein, wherein the copolymer is an acrylonitrile-butadiene-styrene terpolymer.

In accordance with another embodiment, there is provided the composite described herein, comprising a Melt Flow Rate of 10 to 22 g/10 min measured at 230° C./2.16 kg according to ASTM D1238.

In accordance with another embodiment, there is provided a method for producing a composite comprising: providing a wood pulp fibre aqueous suspension; providing a compatibilizer; mixing the wood pulp fibre aqueous suspension, with the compatibilizer to produce a grafted fibre suitable for thermoplastic blending; providing a thermoplastic resin in a vacuum assisted co-extruder and co-extruding the thermoplastic resin and the grafted fibre at controlled temperature to produce the composite.

In accordance with another embodiment, there is provided the method described herein, wherein the compatibilizer is with a maleic anhydride content greater than 40 mg KOH/g and less than 50 mg KOH/g, and molecular weight between 8 000 and 10 000.

In accordance with another embodiment, there is provided the method described herein, wherein the mixing of the wood pulp fibre further includes a suspension of pulp filamentous material mixed with the compatibilizer.

In accordance with another embodiment, there is provided the method described herein, wherein the wood pulp fibre or filamentous material aqueous suspension is from 30 to 40 wt. % solids.

In accordance with another embodiment, there is provided the method described herein, wherein glass fibres are provided with the wood pulp fibre or filamentous aqueous suspension.

In accordance with another embodiment, there is provided the method described herein, wherein the thermoplastic is a polyolefin, a polyester or a co-polymer.

In accordance with another embodiment, there is provided the composite described herein, wherein the polyolefin is a polypropylene or a polyethylene.

In accordance with another embodiment, there is provided the composite described herein, wherein the polyester is a polylactic acid.

In accordance with another embodiment, there is provided the composite described herein, wherein the copolymer is an acrylonitrile-butadiene-styrene terpolymer.

In accordance with another embodiment, there is provided a method for producing a composite comprising: providing a wood pulp fibre aqueous suspension; providing a thermoplastic resin compatibilizer; grafting the wood pulp fibre with the maleic anhydride-based compatibilizer and co-extruding with thermoplastic resin in a vacuum assisted co-extruder to produce the translucent composite.

In accordance with another embodiment, there is provided the method described herein, wherein providing the wood pulp fibre aqueous suspension further comprises a filamentous material selected from the group consisting of cellulose nanofilament, clay nanofilaments and carbon nanofilaments.

In accordance with another embodiment, there is provided the method described herein, wherein the wood pulp fibre aqueous suspension and/or wood pulp filamentous aqueous suspension is from 30 to 40 wt. % solids.

In accordance with another embodiment, there is provided the method described herein, wherein glass fibres are provided with the wood pulp fibre or filamentous aqueous suspension.

In accordance with another embodiment, there is provided a method for producing a composite comprising: providing a dry wood pulp fibre; providing a compatibilizer; mixing the dry wood pulp fibre, with the compatibilizer to produce a grafted fibre suitable for thermoplastic blending; providing a thermoplastic resin in a vacuum assisted co-extruder and co-extruding the thermoplastic resin and the grafted fibre at controlled temperature to produce the composite.

In accordance with another embodiment, there is provided the method described herein, wherein the compatibilizer is with a maleic anhydride content greater than 40 mg KOH/g and less than 50 mg KOH/g, and molecular weight between 8 000 and 10 000.

In accordance with another embodiment, there is provided the method described herein, wherein the mixing of the wood pulp fibre further includes a dry pulp filamentous material mixed with the compatibilizer.

In accordance with another embodiment, there is provided the method described herein, wherein the dry wood pulp fibre or filamentous material is processed using a hammer mill.

In accordance with another embodiment, there is provided the method described herein, wherein glass fibres are provided with the wood pulp fibre or filamentous.

In accordance with another embodiment, there is provided the method described herein, wherein the thermoplastic is a polyolefin, a polyester, or a copolymer.

In accordance with another embodiment, there is provided the composite described herein, wherein the polyolefin is a polypropylene or a polyethylene.

In accordance with another embodiment, there is provided the composite described herein, wherein the polyester is a polylactic acid.

In accordance with another embodiment, there is provided the composite described herein, wherein the copolymer is an acrylonitrile-butadiene-styrene terpolymer.

DESCRIPTION OF THE DRAWINGS

FIG. 1 is a process block diagram of the method described herein according to one embodiment;

FIG. 2 is a schematic illustration of a twin-screw extruder system comprising 6 zones, including a feed zone, where the temperature is precisely controlled in each zone. The vacuum system, as disclosed herein, is introduced in zone 6, prior to the die, in order to allow for, in the previous 5 zones, adequate mixing of the composite ingredients and best facilitate mixing;

FIG. 3B illustrates an extrusion screw (EXT) for the extruder of FIG. 3A;

FIG. 3C illustrates a feed screw (FS) for the extruder of FIG. 3A;

FIG. 3D illustrates a reverse feed screw (RFS) for the extruder of FIG. 3A;

FIG. 3E illustrates a half feed screw (FS/2) for the extruder of FIG. 3A;

FIG. 3F illustrates a reverse half feed screw (RFS/2) for the extruder of FIG. 3A;

FIG. 3G illustrates a mixing element 0° offset for the extruder of FIG. 3A;

FIG. 3H illustrates a mixing element 90° offset for the extruder of FIG. 3A;

FIG. 4A are photographs of pellets and films (identified with FPInnovations) translucent samples of biocomposites of NBSK (Northern Bleached Softwood Kraft) pulp fibres;

FIG. 4B are photographs of pellets and a film (identified with FPInnovations) translucent samples of biocomposites of Aspen Kraft pulp fibres;

FIG. 4C are photographs of pellets and films (identified with FPInnovations) translucent samples of biocomposites of BCTMP (Bleached Chemi-Thermal Mechanical pulp) fibres;

FIG. 4D are photographs of pellets and films (identified with FPInnovations) translucent samples of biocomposites of MDF (medium-density fibres) pulp the darker colour is due to the presence of higher amounts of lignin in the pulp;

FIG. 5 is a schematic illustration of the mechanical performance compared to the density of biocomposites and hybrid composites described herein;

FIGS. 6A-1 and 6A-2 are scanning electron micrograph (SEM) images depicting the morphology of biocomposite specimens before tensile testing;

FIGS. 6B-1 and 6B-2 are scanning electron micrograph (SEM) images depicting biocomposite specimens after tensile testing;

FIGS. 6C-1 and 6C-2 are scanning electron micrograph (SEM) images depicting hybrid composite specimens before tensile testing;

FIGS. 6D-1 and 6D-2 are scanning electron micrograph (SEM) images depicting hybrid biocomposite specimens after tensile testing;

FIG. 9 is a schematic representation of how the flexible conformable fibres improve melt flow characteristics, where the fibres appear to guide the stiffer glass fibres as the composite melt flow through the co-extruder.

DESCRIPTION OF THE TABLES

Figure 3A:
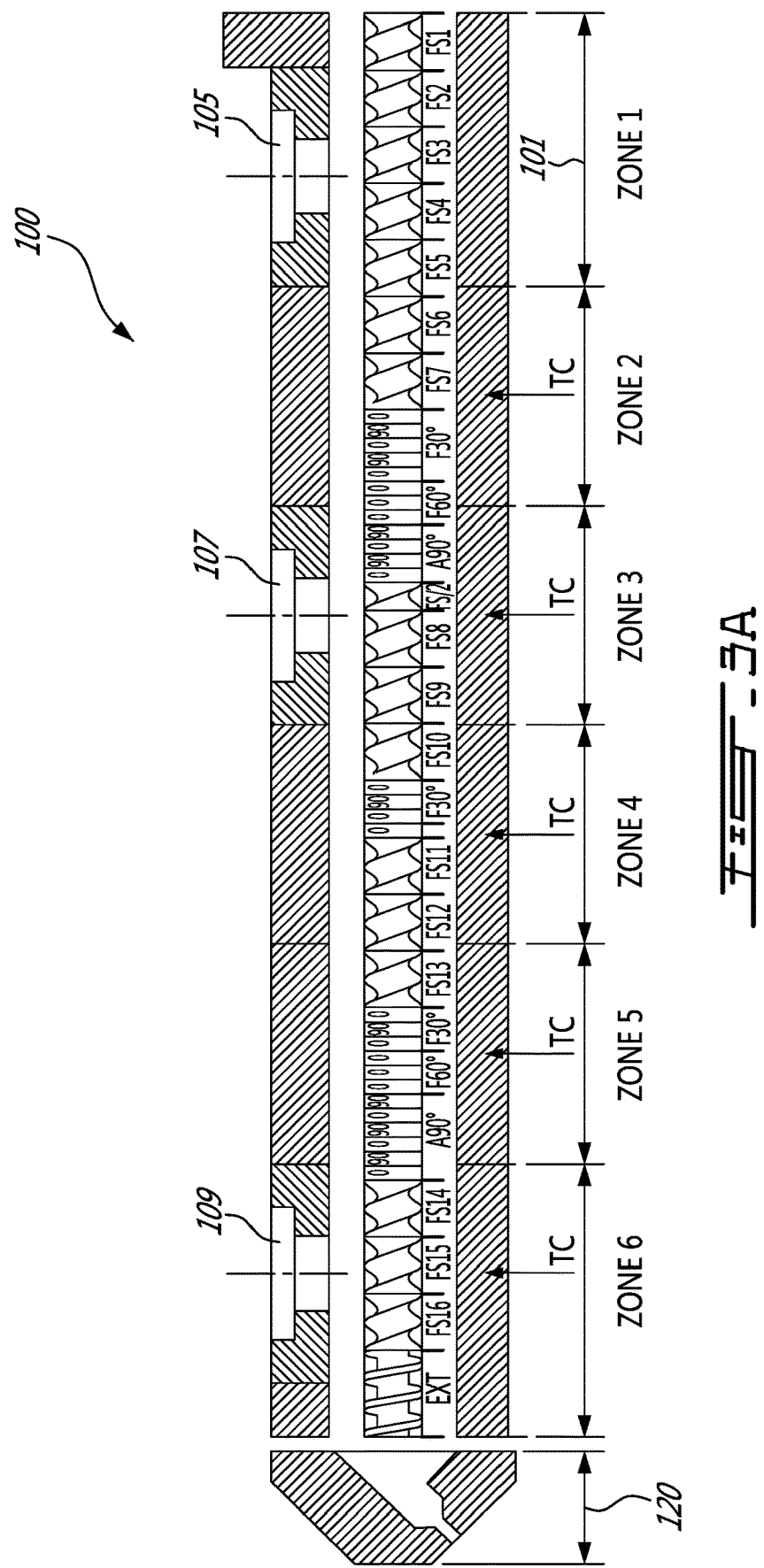
FIG. 3A is a schematic illustration of a screw configuration in the twin-screw co-extruder along the six zones.

Table 1: Mechanical properties for biocomposite comprising 5 wt. % wood pulp fibres, 5 wt. % coupling agent and 90 wt. % thermoplastic polymer. Four types of wood pulp fibres were examined: northern bleached softwood kraft (NBSK), bleached chemi-thermal mechanical pulp (BCTMP), medium-density fibre (MDF) and aspen hardwood kraft (aspen kraft).

Table 2: Mechanical properties for biocomposites containing BCTMP fibres. The fibre loadings varied from 0 to 40 wt. %. The loading of the coupling agent was 10 wt. % of wood-pulp fibre loading.

Table 3: Mechanical properties for conventional short fibre composites containing glass fibres and hybrid composites containing both flexible BCTMP fibres and stiff glass fibres. The fibre loadings are indicated in the table. Coupling agent was used for hybrid composites and the loading was 10 wt. % of wood pulp.

Table 4: Densities of bio- and hybrid composites with various loading of wood pulp fibres and glass fibres. All composites contain coupling agent at 10% by weight of wood-pulp fibre loading, and the remainder is the polypropylene resin.

Table 5: Storage moduli, E', for hybrid composites at −20° C. (below glass transition) and 25° C. (above glass transition). Values for glass transition, $T_g$, is determined from the tan delta plots of FIG. 4b. Three hybrid composite compositions are examined. B samples consist of 5 wt. % wood fibres, either NBSK or MDF, 5 wt. % coupling agent and 90 wt. % polypropylene. D samples consist of 10 wt. % wood fibres, either NBSK or MDF, 10 wt. % coupling agent, 10 wt. % glass fibres and 70 wt. % polypropylene. G samples consist of 5 wt. % wood fibres, either NBSK or MDF, 5 wt. % coupling agent, 20 wt. % glass fibres and 70 wt. % polypropylene.

Table 6: Storage moduli of biocomposites with fibre loadings from 5 wt. % to 40 wt. %. The values are at −20° C. (below glass transition) and 25° C. (above glass transition). Coupling agent loading was 10% by weight of wood-pulp fibre loading, and the remainder is the polypropylene resin.

Table 7: Heat deflection temperature (HDT) and notched impact strength of bio- and hybrid composites at various composition and fibre loadings. Coupling agent loading was 10% by weight of wood-pulp fibre loading, and the remainder is the polypropylene resin.

Table 8: Melt flow rate (MFR) of the hybrid composites. Fiber loading details are described in Table 5.

DETAILED DESCRIPTION

Detailed descriptions of examples are provided herein. However, it is to be understood that the examples may take in various forms. The specific details discussed below are thus not to be interpreted as limiting, but rather as a representative basis for teaching one skilled in the art how to employ the method and composites described herein.

The present method and composite overcome the disadvantages of the prior art by providing a system and method for producing substantially defect-free, transparent or translucent biocomposites comprising flexible natural fibres, or hybrid composites consisting of flexible fibres, tube-like wood pulp fibres or assemblies of nano- or micro-elements filamentous materials like carbon nanotubes or cellulose filaments, and stiff fibres, e.g., glass or carbon fibres, and a suitable thermoplastic polymer. It is possible to also use desired amounts of a coupling agent to improve the interfacial properties particularly between natural fibres and the thermoplastic polymer. The reinforcement fibres are completely surrounded by the thermoplastic polymer owing to the appropriate use of coupling agent and good compatibility between fibre and matrix.

A batch of the natural, flexible fibres and a suitable coupling agent can first be prepared by physically blending the two components using a suitable mixing technique where high shear and low residence time (e.g., commercial Gelimat™ mixer), or low shear and long residence time (commercial Haake mixer) are used. This pre-mixed batch can then be introduced to the co-extruding system and compounded with the thermoplastic polymer melt, or, in the case of hybrid composites, with the stiff fibres (e.g., glass), as well. The composite pellets that are thus produced can be processed into films of controllable thickness or injection- or compression-molded into three-dimensional objects.

The objects produced using the system and method described herein are characterized by being transparent/translucent, indicating the excellent dispersion of the fibre reinforcement within the polymer matrix and the absence of any aggregated fibrous materials. It is also indicative of the fact that no air voids or pockets are trapped within the composite, or within the fibrous assembly. Co-extrusion enables the gentle disentanglement of fibrous filaments and the vacuum system helps remove any entrapped air voids. The compatibilized natural fibres develop very good adhesion such that the fibres are completely surrounded by the polymer, as well as undergo excellent dispersion within the thermoplastic polymer melt as a result of this approach. This effectively leads to producing stronger, stiffer and tougher bio-based polymer composites with excellent flow properties. Illustrative examples will be given detailing the improvement in performance and functionality of the resulting bio- or hybrid composite.

Specifics regarding significant improvements in the mechanical and dynamic properties of the bio- and hybrid composites will be described. Confirmation of excellent interface with and encapsulation of the biofibres within the thermoplastic polymer will also be provided by examining the water uptake of the final composites over long periods of time. The novel system and method described herein produce composites that can flow as well as the original polymer, and significantly better than existing composites reinforced with natural or synthetic fibres.

Figures 1, 6A:
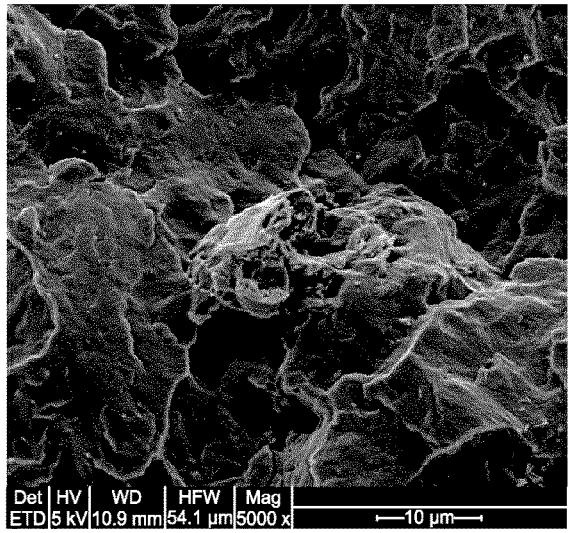

FIG. 1 illustrates a method of vacuum co-extrusion 100 described herein according to one embodiment. Wood pulp fibres/filaments 12 are provided in dry or as an aqueous suspension, and are mixed 10, with a compatibilizer 14. Optionally glass fibres 13 may be provided and mixed into the suspension. The compatibilizer 14 is preferably a maleic anhydride, or has a high maleic anhydride content, or acid number, and relatively low molecular weight (<10,000). The compatibilizer 14 is grafted to the surface of the fibre/filament 12 (during mixing or blending step 10), so the mixing vessel serves as both mixing and reaction vessel.

A mixture of compatibilizer fibre/filament 16 is sent to vacuum co-extrusion 20, where the mixture is co-extruded with a thermoplastic resin 22. The vacuum co-extrusion thoroughly mixes and binds the resin 22 and the mixture 16 while producing water-vapour air 25, and a composite 26 having a low water content 0.5% wt.

Ideally, a batch of composite 26 would first be prepared by physical blending of the flexible fibre and suitable coupling agent then introduced to a co- or counter-rotating twin-screw co-extruder along with the rigid fibre, in the case of hybrid composite preparation, and thermoplastic resin.

Figures 2, 6A:
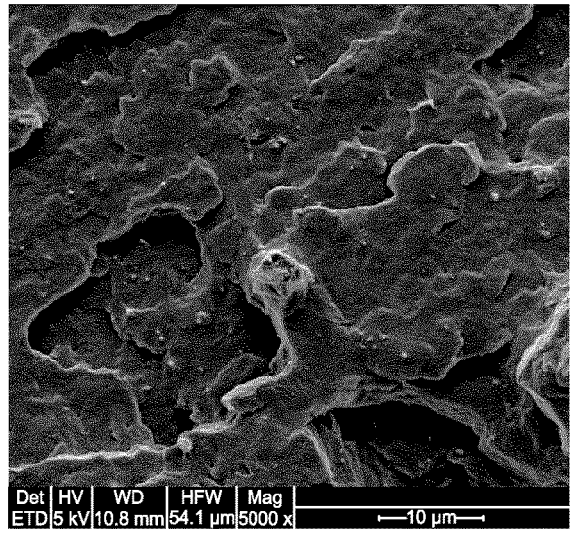
Figures 1, 6B:
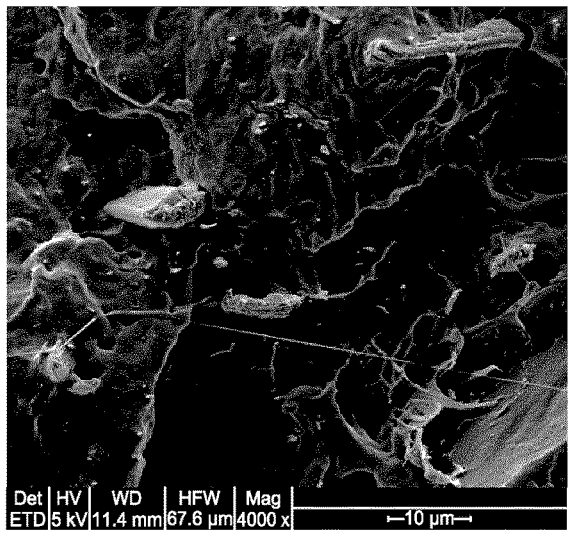
Figures 2, 6B:
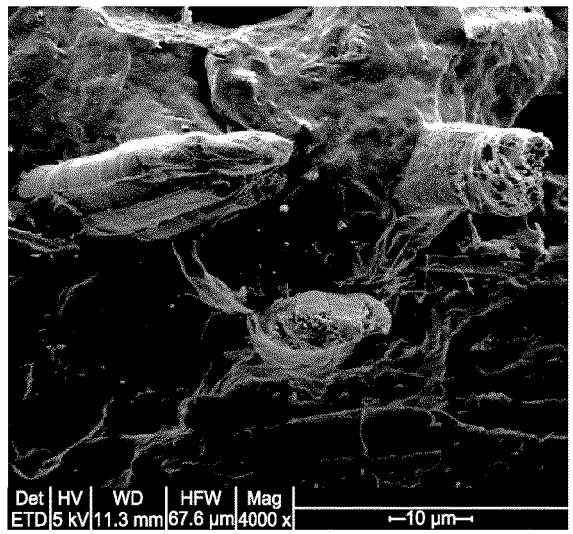
Figures 1, 6C:
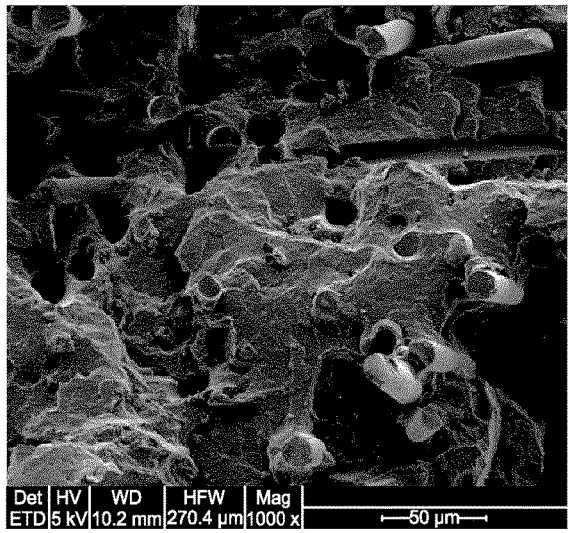
Figures 2, 6C:
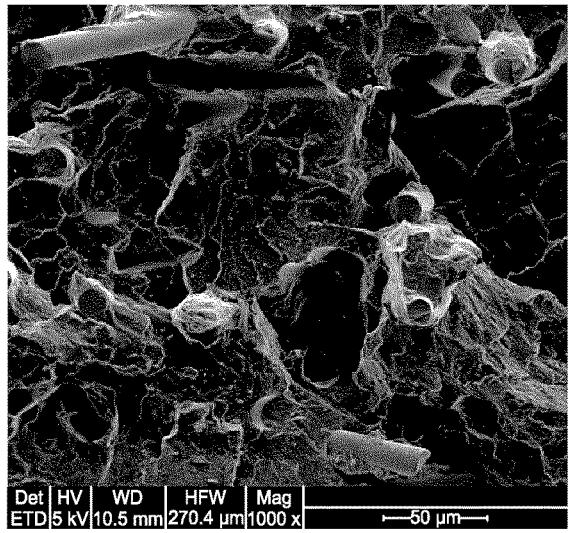
Figures 1, 6D:
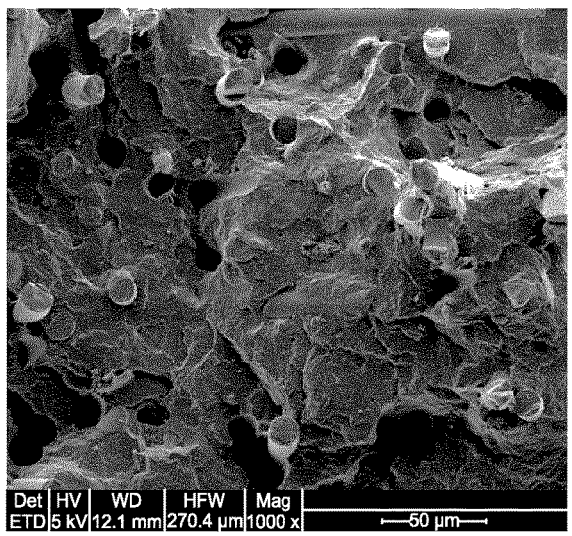
Figures 2, 6D:
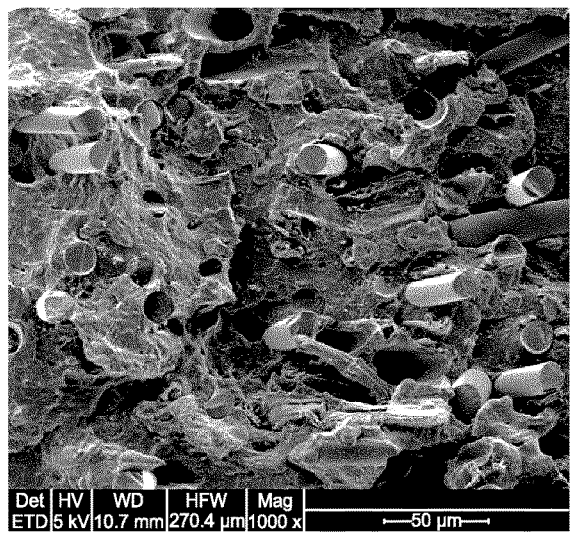

The system and method are described in further detail and are schematically illustrated in FIGS. 2 and 3. Twin-screw extruders 100 have separate zones (here 6 zones are illustrated), where the temperature is precisely and separately controlled according to the type of thermoplastic polymer used. The extrude 100 of FIG. 3A comprises a feed port 105; feed port vents 107 and 109; a cooled feed zone 111, and a die 120; where TC refers to a control thermocouple. FIGS. 3B, 3C, 3D, 3E, 3F, 3G and 3H illustate possible screw and mixing elements. The screw geometry is such that we can optimize feeding, mixing and extruding action. It is possible to re-arrange the screw configuration of FIG. 3A to meet the needs of the specific fibres used. The specific screw configuration can prove ideal for blending, under the shearing action of the co-rotating twin screws, of flexible (e.g., wood pulp) and rigid (e.g., glass) fibres. Changing ratios of flexible-to-rigid fibres may necessitate a variation on the schematic of FIG. 3A. Suffice it to say, the screw geometry can optimally be configured to suit the specific blend of reinforcement fibres and additives.

One consideration in the design is the placement of a suitable vacuum system at or near the end of the co-extruder, where in the present embodiment it is in the final, and or sixth zone. This permits extraction of any entrapped air bubbles and/or moisture (FIG. 3A). There are many reasons for air bubble entrapment, amongst which is heterogeneity of the fibre reinforcement and thermoplastic polymer, as well as blending flexible and stiff fibres or fibrirllar material. If air bubbles are trapped, the final film sample would look grainy and opaque. FIGS. 4A, 4B, 4C and 4D depict photos of pellets and films prepared following the system and method disclosed herein, using different types of flexible, wood pulp fibres of different lengths. All films appear transparent/translucent and the darker appearance in some pellets/films is due to the presence of lignin (in various amounts) in the starting wood pulp fibres. For instance, MDF fibres have higher amounts of lignin (>10%) than kraft fibres or BCTMP, and consequently appear brownish after processing.

An important result of the system and method disclosed herein is the ability of the biocomposites or hybrid composites to have similar flow properties to the starting thermoplastic polymer, which is important for practical and industrial applications. The flow properties can be fine-tuned by controlling the molecular weight of the thermoplastic resin and/or by the addition of plasticising agents. Importantly, the incorporation of flexible and rigid fibres can significantly improve the deflection temperature under load and the impact strength, which translates into better energy absorption capacity of the hybrid composites prepared according to the disclosed method and system, as well as durability under high temperature.

In the case of highly incompatible reinforcing fibres, as in wood pulp fibres, which are highly polar, and non-polar polyolefins (e.g., polypropylene) suitable compatibilizers are necessary to ensure good dispersion and interfacial adhesion between the reinforcing fibres and thermoplastic polymer matrix. In this specific case, coupling agents, e.g., maleic anhydride-modified polypropylene, MaPP, can prove to be cost effective options. Specifically, a MaPP with high maleic anhydride (MA) content is desirable, preferably between 40 and 50 mg KOH/g and molecular weight between 8,000 and 10,000 effectively produces relatively high grafting yield onto the cellulose fibre surfaces and thereby helps to create optimal interfacial adhesion between the cellulose fibres and polymer matrix, as well as good, uniform dispersion within the matrix to help achieve optimal stress transfer, and, thereby, attain improved mechanical performance (see FIG. 5). The compatibilizer can be introduced in dry form, such as pellets or powder, or in wet form as a suspension.

The fibres/filaments described herein are conformable and flexible and these properties distinguish these fibres from wood flow (particles, granules or flakes) and other nature fibres that are stiff. The wood pulp fibres described herein obtain their conformability and flexibility from their structure that is a hollow tube (FIG. 9). Conformability relates to the fiber's ability to correspond or comply with the contours within the composite material, as well as during process when navigating the screws in the twin-screw extruder or high-shear mixer. This conformability essentially leads to the fiber spanning a continuous length without being broken up, as the case would be with stiff, non-conformable fibres.

The flexible fibres can be discrete natural fibres, e.g., wood fibres, fibrillar networks, e.g., cellulose filaments or nanofibrils, and flexible assemblies of nano to micro elements, e.g., assemblies of aggregated carbon nanotubes. It is also possible to use our vacuum-assisted co-extrusion process to produce hybrid composites comprising a rigid fibre, like glass or carbon fibres, and a flexible fibre or fibrillar network, like cellulose fibres or cellulose filaments. The thermoplastic resin can be, but not limited to, polyolefins, like polypropylene or polyethylene, or polyesters, like polylactic acid. Resins can also include thermoplastic co-polymers, e.g., acrylonitrile-butadiene-styrene terpolymer.

The thermoplastic resins described herein include 1) polyolefins that can be petroleum plant based, i.e. polypropylene, polyethylene (high and low density) and 2) thermoplastic polyester, such as polylactic acid.

When a compatibilizer is necessary, it is advantageous to physically blend the coupling agent and fibre using either a high-shear/short residence time system (e.g., Gelimat™) or a low-shear/long residence time system (e.g. Haake). Both systems function equivalently and can produce homogeneous mixtures that can then be introduced to the co-extruder. For both systems, the wood pulp fibres or fibrillar assemblies can be handled in dry or wet conditions, but in a preferred embodiment, as aqueous suspensions ca. 30-40% solids. The ratio of coupling agent-to-wood pulp is experimentally determined depending on the level of the desired interfacial properties and subsequent improvements in mechanical performance. The range can thus vary from 0.05-to-1 coupling agent-to-cellulose fibre to 1:1 by weight. The prepared mixtures may then have to be ground to obtain uniformly-sized particles, using, for instance, a Cemotic Mill, and the milled fibre-coupling agent mixture is ideally screened using a 3 mm sieve. (3 mm being the typical size for commercial thermoplastic polymer pellets.)

The residence time in the co-extruder primarily depends on the screw configuration, screw speed and desired level of blending, or ultimately, the level of improvement in mechanical performance. There must be a balance between (a) the desire to obtain high grafting yield and random, uniform dispersion of the fibres within the matrix in order to achieve optimal interfacial properties, and (b) the need to ensure limited fibre cutting while passing through the mixer or co-extruder. All fibres experience some form of cutting, and the stiffer the fibre, the more pronounced the cutting. Since wood pulp fibres are flexible and supple, they tend to meander within the polymer melt as the two screws co-rotate, thereby minimizing fibre cutting. This is critical to ensure optimal stress transfer. Typically for polypropylene, the temperature profile in the co-extruder from feeder to die is set to: 190/200/210/210/210/180° C., and the extrusion speed around 300 rpm.

The maleic anhydride groups are a class of commercially available coupling agents, maleic anhydride polypropylene, or MaPP, can react with the hydroxyl groups on cellulose through esterification. With the permanent grafting of MaPP onto the surface of the cellulose fibre, the polarity of wood fibres will be reduced and better interfacial interaction with PP can be obtained. A specific coupling agent with a high maleic anhydride content, greater than 40 mg KOH/g but less than 50 mg KOH/g, and molecular weight between 8,000 and 10,000 is a preferred embodiment chosen so as to provide a high degree of MaPP grafting efficiency onto the cellulose fibre surface and good interface between the polar cellulose and non-polar polypropylene. Pre-mixing of cellulose fibres or fibrous materials with the coupling agent using a high-shear/short residence time (e.g., Gelimat) or low-shear/long residence time (e.g., Haake) provides similar grafting yield, ca. 45-65%. The grafting yield strongly influences the interfacial properties, and it is evident that the flexible wood fibres adhere well to the thermoplastic polymer, and do not break or pull out as often as the glass fibres in the case of hybrid composites (FIGS. 6A-1/2, 6B-1/2, 6C-1/2 and 6D-1/2).

The scanning electron micrographs (SEM) can be used to study the interface between the flexible wood fibres and polypropylene matrix in the composites. Untested specimens were prepared for electron microscopy imaging by freeze fracture in liquid nitrogen, whereas the fractured surfaces were imaged in the case of tensile-tested samples. The wood pulp fibres appear flexible and flattened, whereas the glass fibres are round and stiff. It is evident that the flexible wood fibres adhere well to the thermoplastic polymer, and do not fail or pull out as often as the glass fibres in the case of hybrid composites. The biocomposite consists of 5 wt. % wood pulp (northern bleached softwood kraft, NBSK) fibre and equivalent amount, by weight, of coupling agent, and the rest is the thermoplastic polymer, polypropylene. The hybrid composites in this case comprise similar amounts of wood pulp fibres and coupling agent, 15 wt. % rigid glass fibres and 75 wt. % thermoplastic polymer. It is evident from FIG. 6 that there are no gaps between the flexible wood pulp fibres and polymer matrix before testing, which indicates excellent interfacial adhesion between the reinforcing fibres and matrix. Under tension, the flexible wood pulp fibres can accommodate deformation of the matrix and enjoy good stress transfer. There is little evidence of fibre pull-out, thereby attesting to the good adhesion between fibre and matrix. Fibre-pull out is defined as one of the mechanisms of failure in composites reinforced by fibre. Envisioned microscopically as the fibre being pulled out of the composite resin leaving a hole or gap where the fiber was located. Fiber pull-out occurs because the interface between the fiber and matrix is weaker than the fiber strength.

Consequently, and as evident from the morphology of fractured biocomposite surfaces, the flexible wood fibres practically experience no fibre pull-out owing to the good adhesion between fibre and resin. The striations on the fracture composite surfaces indicate yielding of the thermoplastic polymer under external tensile loading.

It is worthwhile noting from FIGS. FIGS. 6A-1/2, 6B-1/2, 6C-1/2 and 6D-1/2, as well, that the hybrid composite samples depict a larger percentage of pulled-out stiff (glass) fibres, as well as breakage of these fibres. It is fair to indicate that in hybrid composites, the flexible fibres experience little to no pull-out, limited breakage, whereas the stiff (glass) fibres undergo the highest extent of fibre pull-out. The presently described composite is unique in allowing full potential of the flexible fibres and a good synergy between the flexible and stiff fibres, where optimal stress transfer may be attained—as confirmed by improved mechanical performance, see Table 1.

Table 1 includes the tensile strength, flexural properties and water absorption (measured gravimetrically) data for biocomposite comprising 5 wt. % wood pulp fibres, 5 wt. % coupling agent and 90 wt. % thermoplastic polymer. Four types of wood pulp fibres were examined: Northern bleached softwood kraft (NBSK), bleached chemi-thermal mechanical pulp (BCTMP), medium-density fibre (MDF) and Aspen hardwood kraft (Aspen kraft).

TABLE 1

| Sample | Tensile Strength (at yield) (MPa) | Young's Modulus (MPa) | Flexural Modulus (MPa) | Flexural Strength (at max. load) (MPa) | 24-hour Water Absorption (%) |
|---|---|---|---|---|---|
| Polypropylene | 31.2 ± 1.5 | 1043 ± 101 | 1803 ± 34 | 73.4 ± 1.4 | 0.09 ± 0.06 |
| NBSK | 39.3 ± 0.3 | 1478 ± 22 | 2090 ± 95 | 81.0 ± 3.0 | 0.45 ± 0.13 |
| BCTMP | 39.4 ± 0.4 | 1470 ± 19 | 1830 ± 157 | 73.9 ± 6.9 | 0.45 ± 0.11 |
| MDF | 39.0 ± 0.7 | 1463 ± 28 | 1989 ± 143 | 77.5 ± 4.1 | 0.28 ± 0.12 |
| Aspen kraft | 39.3 ± 0.5 | 1498 ± 28 | 1854 ± 141 | 71.9 ± 4.2 | 0.40 ± 0.06 |

Table 2 includes the tensile properties, flexural properties, and water absorption (measured gravimetrically) data for biocomposites containing BCTMP fibres. The fibre loadings varied from 0 to 40 wt. %. The loading of coupling agent was 10 wt. % of wood pulp. The mechanical performance of bio-composites improves significantly with the increase of fibre loading. Meanwhile, the 24-hour water uptake can maintain below 1% even at 40% of wood fibre loading, suggesting even dispersion of wood pulp fibres and good seals of fibres by the thermoplastic polymer.

FIG. 5 illustrates a schematic of the mechanical performance with respect to measured density. The use of flexible wood fibres leads to less dense composites, especially when compared to composites reinforced with mineral fibres like glass fibres. Table 4 lists densities of bio- and hybrid composites with various loading of wood-pulp fibres and glass fibres. It is possible to produce a spectrum of hybrid composites that can compete on performance as well as reduced weight of the final component. Weight reduction can significantly impact waste, and critically fuel efficiency in the case of producing, for instance, automotive parts. Our system and method clearly indicate the ability to produce hybrid composites that are lighter and better, or at least equally, performing relative to dense thermoplastic composites reinforced with mineral fibres or fillers.

TABLE 2

| Loading of BCTMP (%) | Tensile Strength (at yield) (MPa) | Young's Modulus (MPa) | Flexural Modulus (MPa) | Flexural Strength (at max. load) (MPa) | 24-hour Water Absorption (%) |
|---|---|---|---|---|---|
| 0 | 32.0 ± 0.1 | 1350 ± 39 | 1274 ± 35 | 42.0 ± 0.7 | 0.04 ± 0.02 |
| 5 | 34.4 ± 0.2 | 1649 ± 56 | 1611 ± 19 | 50.1 ± 0.4 | 0.06 ± 0.03 |
| 20 | 39.6 ± 0.1 | 2463 ± 91 | 2374 ± 19 | 62.9 ± 0.4 | 0.14 ± 0.01 |
| 30 | 44.0 ± 0.1 | 3304 ± 284 | 2909 ± 67 | 68.9 ± 0.3 | 0.31 ± 0.01 |
| 40 | 50.9 ± 0.3 | 4235 ± 160 | 3710 ± 15 | 77.4 ± 0.4 | 0.58 ± 0.04 |

Table 3 includes the tensile properties, flexural properties, and water absorption (measured gravimetrically) data for conventional short fibre composites containing glass fibres and hybrid composites containing both flexible BCTMP fibres and stiff glass fibres. The fibre loadings are indicated in the table. Coupling agent was used for hybrid composites and the loading was 10 wt. % of wood pulp. The hybrid composites show apparently improved strength compared to the conventional short fibre composites at the same level of fibre loading.

TABLE 4

| Sample | Density (g/cm3) |
|---|---|
| Polypropylene | 0.899 ± 0.001 |
| 5% BCTMP | 0.919 ± 0.002 |

TABLE 3

| | Tensile Strength (at yield) (MPa) | Young's Modulus (MPa) | Flexural Modulus (MPa) | Flexural Strength (at max. load) (MPa) | 24-hour Water Absorption (%) |
|---|---|---|---|---|---|
| Loading of Fillers (BCTMP %-GF* %) | | | | | |
| 0-20 | 34.8 ± 0.1 | 2810 ± 71 | 2780 ± 329 | 54.8 ± 2.3 | 0.02 ± 0.01 |
| 0-30 | 35.3 ± 0.1 | 3873 ± 169 | 3781 ± 85 | 57.9 ± 0.5 | 0.02 ± 0.01 |
| 20-10 | 42.6 ± 0.1 | 3313 ± 223 | 3096 ± 92 | 69.6 ± 1.2 | 0.15 ± 0.01 |
| 15-15 | 39.9 ± 0.1 | 3296 ± 137 | 3129 ± 20 | 65.6 ± 0.2 | 0.11 ± 0.01 |
| Sample | | | | | |
| Polypropylene | 31.2 ± 1.5 | 1043 ± 101 | 1803 ± 34 | 73.4 ± 1.4 | |
| B (NBSK) | 39.3 ± 0.3 | 1478 ± 22 | 2090 ± 95 | 81 ± 3 | |
| D (NBSK) | 45.9 ± 1.3 | 1808 ± 27 | 2727 ± 285 | 61 ± 3.8 | |
| G (NBSK) | 43.3 ± 0.4 | 1801 ± 18 | 2750 ± 120 | 66.9 ± 4.8 | |

*GF = glass fibre

TABLE 4-continued

| Sample | Density (g/cm3) |
|---|---|
| 20% BCTMP | 0.976 ± 0.002 |
| 30% BCTMP | 1.014 ± 0.002 |
| 40% BCTMP | 1.058 ± 0.001 |
| 20% Glass Fibre | 1.040 ± 0.002 |
| 30% Glass Fibre | 1.123 ± 0.002 |
| 20% BCTMP + 10% Glass Fibre | 1.056 ± 0.001 |
| 15% BCTMP + 15% Glass Fibre | 1.056 ± 0.001 |

Water absorption has a significant impact on the performance and long-term durability of composites. Water can induce micro-cracking and de-bonding in the composites, which will reduce the composite's mechanical properties. However, the limit for water uptake can vary depending on the application. For automotive parts, for instance, values for long term immersion in water less than 1 wt. % are desirable. As indicated in Table 1 and Table 2, the 24-hour water uptake for bio- or hybrid composites consisting of flexible wood fibres and stiff mineral fibres is in all cases studied <1 wt. %. It is therefore possible for the bio- and hybrid composites discussed in this disclosure to have both good mechanical properties and acceptable water absorption at reduced weight or density.

Figure 7A:
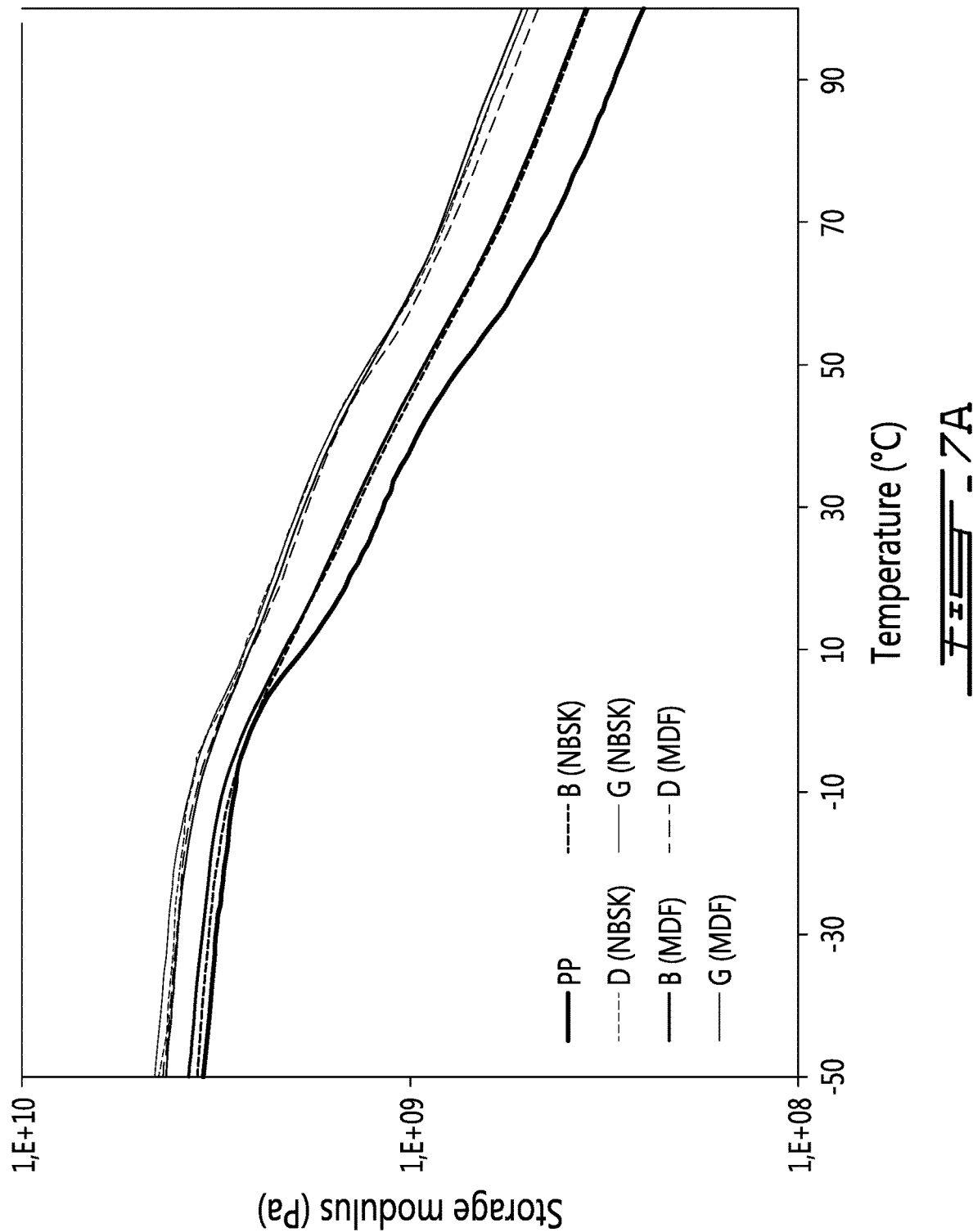
FIG. 7 is a graph of dynamic mechanical analysis of hybrid composites comprising wood pulp, glass fibres and polypropylene, where northern bleached softwood kraft (NBSK) or medium-density (MDF) fibres are used for wood pulp: 7(a) storage modulus.
FIG. 7B is a graph of tan delta, or loss factor v. temperature dynamical mechanical analysis (DMA) was performed on a Perkin Elmer DMA 8000 in tension mode, and the composite specimens were cut into 5 mm-wide strips with a 0.4 mm thickness. The gauge length, or the distance between the grips, was set at 10 mm, and the measurement were performed in isochronal conditions of 1 Hz using at a fixed strain of 0.02 mm and with a temperature ramp of 3° C.min$^{-1}$. Three hybrid composite compositions are examined. B samples consist of 5 wt. % wood fibres, either NBSK or MDF, 5 wt. % coupling agent and 90 wt. % polypropylene. D samples consist of 10 wt. % wood fibres, either NBSK or MDF, 10 wt. % coupling agent, 10 wt. % glass fibres and 70 wt. % polypropylene. G samples consist of 5 wt. % wood fibres, either NBSK or MDF, 5 wt. % coupling agent, 20 wt. % glass fibres and 70 wt. % polypropylene.
Figure 7B:
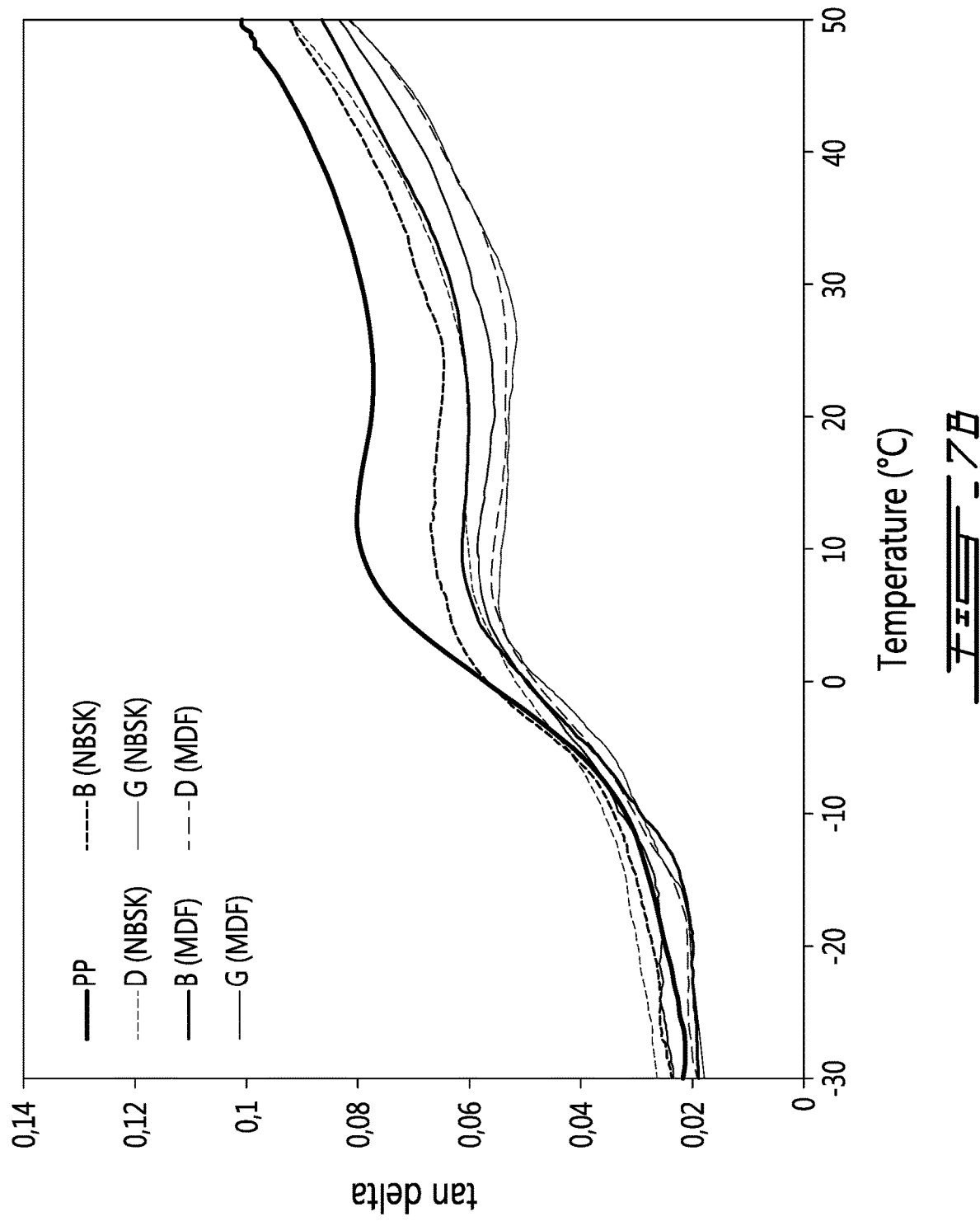
Figure 8A:
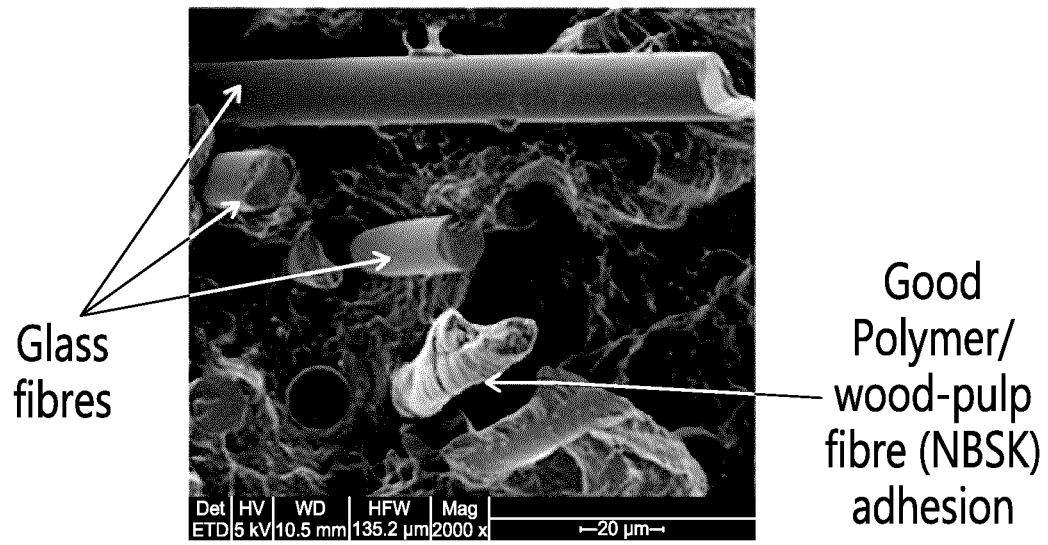
FIGS. 8A, 8B, 8C and 8D are Scanning Electron Micrographs (SEM) of specimens of the composite described herein illustrating the nature of the conformable, flexible wood-pulp fibres, and their good adhesion with the thermoplastic resin, further glass fibres also are visible.
Figure 8B:
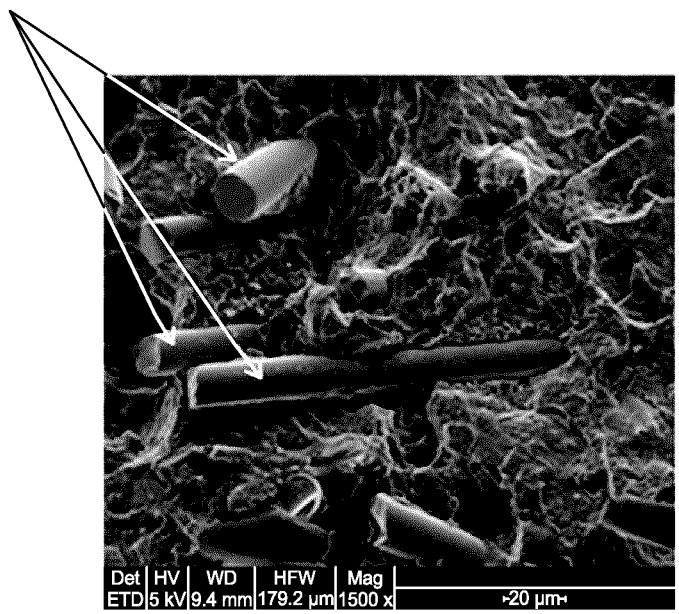
Figure 8C:
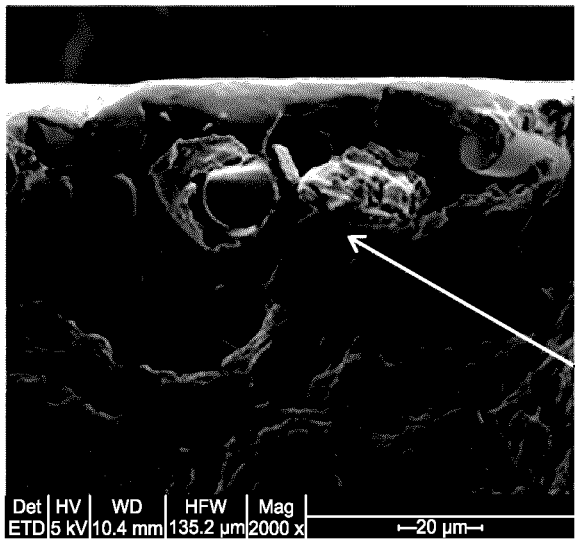
Figure 8D:
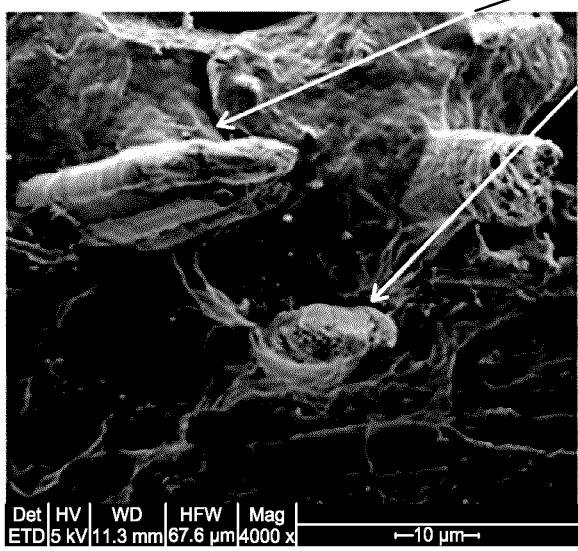

Further confirmation of the improvement in mechanical performance of hybrid composites can be obtained from examining the dynamic mechanical response of these composites to applied loading at a specified frequency for a range of temperatures (FIG. 7), or at a specific temperature for a range of frequencies. The storage moduli of hybrid composites (comprising northern bleached softwood kraft, NBSK, or medium density, MDF, fibres, along with glass fibres and polypropylene) as a function of temperature illustrate the effect of wood fibre and glass fibre on the thermomechanical properties of the thermoplastic polymer. A significant decrease in storage modulus is detected in the region from about −25° C. to 25° C., which corresponds to the glass transition region of polypropylene. This is based on established experimental evidence that the mechanical loss factor, or tan delta, curve for polypropylene exhibits three relaxations in the vicinity of 100° C. (α) 10° C. (β), and −80° C. (γ). The β relaxation corresponds to the glass-rubber transition of the amorphous portions of polypropylene, and the temperature of the maximum peak for tan delta is the glass transition temperature ($T_g$). As evidenced by the results presented in FIG. 6, the incorporation of flexible wood pulp fibres and rigid glass fibre using the system and method described herein considerably improves the storage moduli of the hybrid composites relative to the polymer resin (polypropylene) over a wide range of temperature. The storage moduli of a representative group of hybrid composites at −20° C. (below $T_g$) and 25° C. (above $T_g$) are given in Table 5. Note that $T_g$ was determined from the tan delta plot of FIG. 7b.

Table 5 includes a storage moduli, E', for hybrid composites at −20° C. (below glass transition) and 25° C. (above glass transition). Values for glass transition, $T_g$, is determined from the tan delta plots of FIG. 5b. Three hybrid composite compositions are examined. B samples consist of 5 wt. % wood fibres, either NBSK or MDF, 5 wt. % coupling agent and 90 wt. % polypropylene. D samples consist of 10 wt. % wood fibres, either NBSK or MDF, 10 wt. % coupling agent, 10 wt. % glass fibres and 70 wt. % polypropylene. G samples consist of 5 wt. % wood fibres, either NBSK or MDF, 5 wt. % coupling agent, 20 wt. % glass fibres and 70 wt. % polypropylene.

TABLE 5

| Sample | E' at −20° C. (MPa) | E' at 25° C. (Mpa) | $T_g$ (° C.) |
|---|---|---|---|
| Polypropylene | 2690 | 1150 | 12 |
| B (NBSK) | 3230 | 1580 | 9.6 |
| D (NBSK) | 3980 | 2090 | 11.4 |
| G (NBSK) | 3870 | 1970 | 9.0 |
| B (MDF) | 3150 | 1470 | 10.8 |
| D (MDF) | 3460 | 1750 | 10.2 |
| G (MDF) | 3770 | 2050 | 9.7 |

The results indicate that the storage moduli significantly increase, relative to the control polymer resin, below and above the glass-transition temperature, $T_g$. The range of improvement averages around 50%, and can reach 80% in certain cases for storage moduli above $T_g$. It is important to note that the storage moduli follow similar trends to improvements in tensile and flexural properties of these hybrid composites (see Table 3 for hybrid composites prepared with NBSK and glass fibres).

The storage moduli of biocomposites at −20° C. (below glass transition) and 25° C. (above glass transition) are given in Table. The values increase with increasing flexible BCTMP fibre loading.

TABLE 6

| BCTMP Loadings in Biocomposites (wt. %) | E' at −20° C. (MPa) | E' at 25° C. (MPa) |
|---|---|---|
| 5 | 5165 | 2055 |
| 20 | 6085 | 2731 |
| 30 | 6752 | 3337 |
| 40 | 7336 | 4246 |

Incorporating flexible, wood pulp fibres, as well as stiff glass fibres, into thermoplastic polymers following the system and method disclosed herein leads to shifting the glass transition, $T_g$, of the polymer to slightly lower temperatures (Table 5). The decrease in $T_g$ can be explained by the increase in segmental mobility of the polymer chains. Moreover, examining the tan delta plots shown in FIG. 6b clearly indicates that the tan delta values tend to decrease, in a similar manner, for all hybrid composites. This decrease is believed to be due to the strengthening effect by the blend of flexible and stiff fibres, which leads to limiting the mobility of the polymer matrix. It is significant to note that the incorporation of flexible and/or rigid fibres in the thermoplastic polymer resin does not change the polymer melting point; however, the presence of the fibres leads to strong nucleation, and ultimately impact crystallization of the thermoplastic polymer.

An important feature of the system and method disclosed herein is that the presence of wood-pulp fibres in bio- and hybrid composites can significantly improve the heat deflection temperature (HDT) under load and the notched impact strength. This translates into better energy absorption capacity of the composites and durability under high temperature. Table 7 provides the HDT and notched impact strength data for bio- and hybrid composites prepared according to the disclosed method and system.

TABLE 7

| Sample | HDT (° C.) | Notched Impact Strength (kJ/m²) |
|---|---|---|
| Polypropylene | 49.4 ± 0.8 | 1.91 ± 0.26 |
| 5% BCTMP | 53.7 ± 0.3 | 2.23 ± 0.38 |
| 20% BCTMP | 69.6 ± 0.6 | 2.31 ± 0.28 |
| 30% BCTMP | 95.0 ± 1.3 | 3.37 ± 0.40 |
| 40% BCTMP | 113.9 ± 1.8 | 3.24 ± 0.45 |
| 20% Glass Fibre | 79.3 ± 1.8 | 2.46 ± 0.09 |
| 30% Glass Fibre | 85.7 ± 0.7 | 2.75 ± 0.07 |
| 20% BCTMP + 10% Glass Fibre | 84.7 ± 0.5 | 2.48 ± 0.15 |
| 15% BCTMP + 15% Glass Fibre | 80.9 ± 0.8 | 2.18 ± 0.10 |

An advantageous feature of the system and method disclosed herein is the ability of the biocomposites or hybrid composites to have similar flow properties to the starting thermoplastic polymer, which is important for practical and industrial applications. The melt flow rates for a select set of hybrid composites are presented in Table 8. This indicates the flowability and thermoformability of the composites are unperturbed by the incorporation of fibres using our disclosed method and system.

Table 8 includes melt flow rates (MFR) of one type of hybrid composites discussed in Table 5.

TABLE 8

| Sample | MFR (g/10 min) | HDT (° C.) | Impact Strength (kJ/m²) |
|---|---|---|---|
| Polypropylene | 15.77 | 51 ± 0.1 | 1.93 ± 0.16 |
| B (NBSK) | 17.70 | 56.4 ± 0.3 | 2.56 ± 0.33 |
| D (NBSK) | 12.52 | 92.9 ± 2.4 | 2.82 ± 0.38 |
| G (NBSK) | 14.28 | 102.6 ± 0.8 | 2.77 ± 0.3 |

FIGS. 8A, 8B, 8C and 8D illustrate clearly the tubular nature of the fibre filaments described herein that have good adhesion with the thermoplastic resin.

FIG. 9 schematically illustrates how the flexible conformed fibre/filaments improve melt-flow properties by guiding still glass fibres as a composite melt flow proceeds through the co-extruder. This unique feature allows the final composite to have a high melt flow rate index as measured by ASTM standard D1238 (typically measured in units of g/10 min and 230° C. under a 2.16 kg load).

REFERENCES

1. Koch, K., "Method and apparatus for extruding plastic and similar material," U.S. Pat. No. 4,067,554.
2. Koch, K., "Process and apparatus for extruding plastic and similar material," U.S. Pat. No. 4,063,718.
3. Tardif, M.-A., "Vacuum removal of entrained gasses in extruded, foamed polyurethane," US Patent Application 2011/0001255 A1.
4. Marshall, J. M., and Liu, J. J., "System and method for twin screw extrusion of a fibrous porous substrate," US Patent Application 2009/0166910 A1.
5. ASTM D 882-09 Standard Test Method for Tensile Properties of Thin Plastic Sheeting.
6. ASTM D 790-07 Standard Test Methods for Flexural Properties of Unreinforced and Reinforced Plastics and Electrical Insulating Materials.

The invention claimed is:

1. A composite comprising:
    31 to 97.9 wt. % of a thermoplastic resin;
    0.1 to 10 wt. % of a compatibilizer comprising a maleic anhydride content greater than 40 mg KOH/g and less than 50 mg KOH/g, and molecular weight between 8 000 and 10 000; and
    2 to 63 wt. % of wood pulp fibres and/or a filamentous material, wherein the composite comprises less than 0.5 wt. % of water, wherein said wood pulp fibres are tube-like and conformable, wherein the composite comprises a Melt Flow Rate of 10 to 22 g/10 min measured at 230° C. / 2.16 kg according to ASTM D1238, and wherein the composite has a tensile strength at yield of from 29.7 to 51.2 MPa.

2. The composite of claim 1, wherein said composite comprises between 40% wt. % to 63% of wood pulp fibres and/or filamentous material.

3. The composite of claim 1, wherein the thermoplastic is a polyolefin, a polyester or a co-polymer resin.

4. The composite of claim 1, wherein the polyolefin is a polypropylene or a polyethylene.

5. The composite of claim 1, wherein the polyester is a polylactic acid.

6. The composite of claim 1, wherein the copolymer is an acrylonitrile-butadienestyrene terpolymer.

7. The composite of claim 1, wherein the thermoplastic resin is 55 to 90 wt. % of the composite.

8. The composite of claim 1 further comprising 10 to 20 wt. % glass fibres.

9. The composite of claim 1, wherein the filamentous material is selected from the group consisting of cellulose filaments and carbon nanofibres.

10. A method for producing a composite as defined in claim 1 comprising:
    providing an aqueous suspension of tube-like and conformable wood pulp fibres and cellulose filamentous material or providing tube-like and conformable dry wood pulp fibres and dry pulp filamentous material;
    providing a compatibilizer comprising a maleic anhydride content greater than 40 mg KOH/g and less than 50 mg KOH/g, and molecular weight between 8 000 and 10 000;
    mixing the wood pulp fibres aqueous suspension or the dry wood pulp fibers and dry pulp filamentous material, with the compatibilizer to produce a grafted fibre suitable for thermoplastic blending;
    providing a thermoplastic resin in a vacuum assisted co-extruder and co-extruding the thermoplastic resin and the grafted fibre at controlled temperature to produce the composite, said composite comprising up to 63 wt. % of wood pulp fibres and/or filamentous material.

11. The method of claim 10, wherein the cellulose filamentous material is selected from the group consisting of cellulose filaments and carbon nanofibres.

12. The method of claim 10, wherein the aqueous suspension of wood pulp fibre and filamentous material comprises from 30 to 40 wt. % solids.

13. The method of claim 10, further comprising providing glass fibres with the aqueous suspension of wood pulp fibre and cellulose filamentous material or with the dry wood pulp fibers and dry filamentous material.

14. The method of claim 10, wherein the thermoplastic is a polyolefin, a polyester or a co-polymer.

15. The method of claim 10, wherein the copolymer is an acrylonitrile-butadienestyrene terpolymer.

16. The method of claim 13, wherein the polyolefin is a propylene or a polyethylene.

17. The method of claim 13, wherein the polyester is a polylactic acid.

18. The method of claim 10, wherein the dry pulp filamentous material is selected from the group consisting of cellulose filaments, clay platelets and carbon nanofibres.

* * * * *